United States Patent [19]

Uchida et al.

[11] Patent Number: 5,093,444

[45] Date of Patent: Mar. 3, 1992

[54] ACRYLIC RESIN FOR OPTICAL ELEMENTS

[75] Inventors: Hiroyuki Uchida; Kazuaki Namiki; Hisamitsu Suzuki, all of Yamanashi, Japan

[73] Assignees: Pioneer Electronic Corporation, Tokyo; Pioneer Video Corporation, Yamanashi, both of Japan

[21] Appl. No.: 443,831

[22] Filed: Dec. 1, 1989

Related U.S. Application Data

[63] Continuation of Ser. No. 248,122, Sep. 23, 1988, abandoned.

[30] Foreign Application Priority Data

Mar. 11, 1988 [JP] Japan .................................. 63-57400

[51] Int. Cl.$^5$ ................................................ C08F 2/18
[52] U.S. Cl. .................................... 526/233; 526/234; 526/318.44
[58] Field of Search ............ 526/233, 234, 318, 328.5, 526/318.44

[56] References Cited

U.S. PATENT DOCUMENTS 3,218,302 11/1965 Melamed ........................ 526/328.5
3,931,133 1/1976 Desilles ............................. 526/233

FOREIGN PATENT DOCUMENTS 152271 3/1950 Australia .
1125992 7/1968 United Kingdom .

Primary Examiner—Joseph L. Schofer
Assistant Examiner—Jeffrey T. Smith
Attorney, Agent, or Firm—Foley & Lardner

[57] ABSTRACT

Acrylic resin for an optical element prepared through suspension polymerization in which reactants include; a 100 parts by weight of a mixture of methyl methacrylate and either one of ethyl acrylate and methyl acrylate; and sodium sulfate or sodium phosphate of 0.15 through 0.25 parts by weight.

3 Claims, 3 Drawing Sheets

ACRYLIC RESIN FOR OPTICAL ELEMENTS

This application is a continuation of application Ser. No. 07/248,122, filed Sept. 23, 1988 now abandoned.

BACKGROUND OF THE INVENTION

1. Field of the Invention

The present invention relates to acrylic resin which is obtained through suspension polymerization such as Poly(Methyl MethAcrylate) which is referred to as PMMA hereinafter.

2. Description of the Prior Art

The PMMA is a plastic material which is known as an organic glass. The PMMA has been recently used for a transparent substrate of an optical recording disk. This is because the PMMA is readily formed into a desired shape such as a disk by casting and the resultant has a sufficient strength although it is somewhat inferior to an inorganic glass in optical properties.

The PMMA is supplied to the market in the form of monomer for casting or of pellets for injection molding. The substrate obtained through the casting has a cross-linking structure because of the conversion of monomer to polymer. The substrate has therefore a good hardness at its surface and a good thermal property. The polymerization reaction during the casting is exothermic and causes some shrinkage so that the resultant substrate necessarily has strains. Thus, the polymerization reaction should be retarded to avoid the strains in the substrate, and therefore the productivity becomes low, so that the cost for manufacture of the substrate has been relatively high.

Nowadays the transparent substrate is manufactured via injection molding from pellets of PMMA which are obtained through suspension polymerization which is used mainly for the production of PMMA.

Suspension polymerization is a method in which polymerization is conducted in a liquid (water is mainly used) while monomers are suspended therein together with an initiator and a stabilizer. The polymerization is carried out in beads of suspended monomers in the liquid which absorbs heat of reaction. The beads of polymer are precipitated after stirring. This method is widely used in the industry of plastic because of easiness of separation of the produced beads of polymer from the liquid.

A starting material of monomer such as methyl methacrylate, ethyl acrylate, methyl acrylate or the mixture thereof is used in suspension polymerization. The starting material is added to water in a vessel together with a predetermined amount of additives such as a catalyst, a suspending agent and a stabilizer. These reactants are stirred at a predetermined temperature. Meanwhile, the suspension is cooled down and acidified to remove the suspending agent. The beads of polymer are then filtered off, washed and dried in air.

A standard process for manufacturing pellets of PMMA through suspension polymerization is schematically illustrated in FIG. 1.

The starting material of monomer, for example, methyl methacrylate, ethyl acrylate, methyl acrylate, etc. is added together with a catalyst, an initiator and a suspending agent into water in a reaction vessel 1. A surface active agent is added to these reactants for uniformly suspending beads thereof. A stabilizer, e.g. sodium sulfate ($Na_2SO_4$) or sodium phosphate is also added to these reactants for stabilizing this reaction system. These reactants are stirred while being initially heated up to a predetermined temperature. The polymerization advances to produce beads of polymer in the form of slurry. The slurry is transferred to a treating and washing vessel 2 to be treated and washed so as to remove disused substances such as the suspension agent. The resultant slurry is transferred to a dewatering machine 3 to remove water. The slurry is concurrently transferred to a dryer 4 to be dried. The resultant cake is transferred through an extruder 5 to a pelletizer 6 which transforms the beads of polymer into pellets of PMMA.

The obtained pellets of PMMA are formed through injection molding by means of a predetermined die into a transparent substrate of an optical recording disk.

When however a video signal bearing surface is mounted on the substrate made from the pellets of PMMA in order to manufacture an optical video disk, a deterioration of the reproduced image with the so-called "color flash" sometimes occurs during a playback operation of the manufactured optical video disk.

Inventors of the present application investigated the cause of the "color flash" phenomenon. As a result, the inventors have found that a defect 14 on the video signal surface, i.e., a recess 14a caused by a minute bubble remaining thereon damages the reproduced image of the optical video disk, as shown in FIG. 2. The size of each pit on the optical recording disk is approximately 1.0 μm and of the same order as the minute bubbles. When the recess 14a caused by the bubble exists close to the pit 13 between the transparent substrate 11 and the reflection layer 12, the pit 13 can not be accurately read out by the laser spot 15. In this way, the color flash phenomenon occurs in the reproduced image of the optical video disk.

SUMMARY OF THE INVENTION

An object of the present invention is to provide acrylic resin for an optical recording disk prepared through suspension polymerization, which is free from minute bubbles causing such unwanted degradation in the reproduction of the recorded image signal.

Acrylic resin for a substrate of an optical recording disk according to a first aspect of the present invention is prepared through suspension polymerization in which reactants include: a mixture of methyl methacrylate and either one of ethyl acrylate and methyl acrylate, and of 100 parts by weight; and sodium sulfate or sodium phosphate of 0.15 through 0.25 parts by weight.

A method of producing acrylic resin for a substrate of an optical recording disk prepared through suspension polymerization according to a second aspect of the present invention comprises the steps of: mixing 0.15–0.25 parts by weight of sodium sulfate or sodium phosphate with 100 parts by weight of a mixture of methyl methacrylate and either one of ethyl acrylate and methyl acrylate; stirring the resultant mixture with water so as to prepare suspension system while heating above a preselected temperature; mixing the resultant with an active liquid which is reactive with non-reacted substances within the resultant; washing the resultant; and forming the washed resultant into small pieces.

A method of manufacturing a substrate of an optical recording disk made of an acrylic resin prepared through suspension polymerization according to a third aspect of the present invention comprises the steps of: mixing 0.15–0.25 parts by weight of sodium sulfate or sodium phosphate with 100 parts by weight of a mixture of methyl methacrylate and either one of ethyl acrylate and methyl acrylate; stirring the resultant mixture with water so as to prepare suspension system while heating above a preselected temperature; mixing the resultant with an active liquid which is reactive with non-reacted substances within the resultant; washing the resultant; and molding the washed resultant into the substrate.

The method of manufacturing the substrate may include an additional step of filtering the washed resultant after the washing. This method may include another step of forming the washed resultant into small pieces such as pellets before the molding.

DESCRIPTION OF THE PREFERRED EMBODIMENTS

Figure 1:
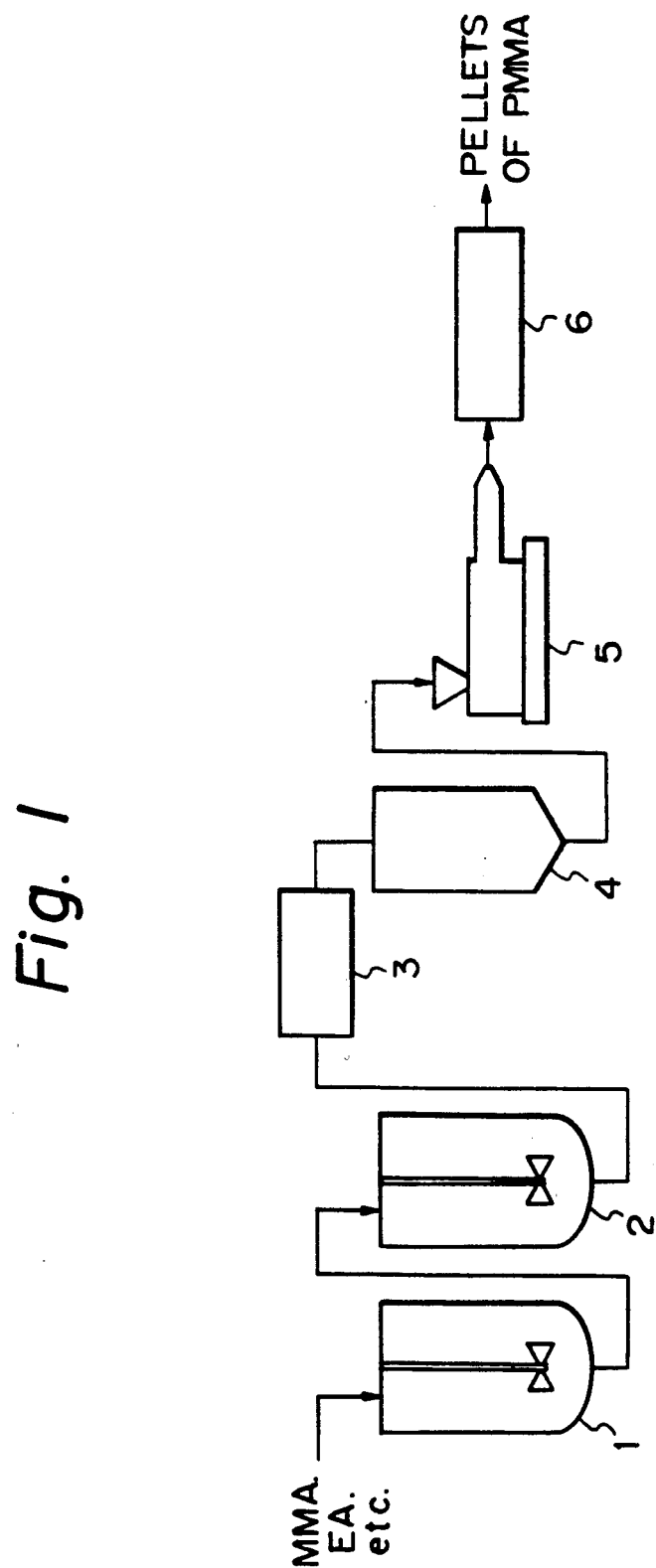
FIG. 1 is a schematic diagram showing a method for producing acrylic resin through suspension polymerization.
Figure 2:
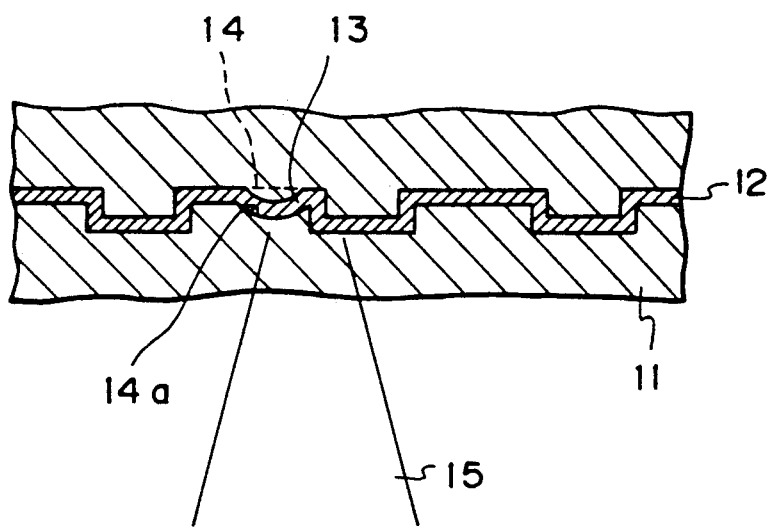
FIG. 2 is an enlarged sectional view of the optical recording disk.

The inventors of the present application have performed experiments in order to investigate a cause of occurrence of optical abnormal portions such as minute bubbles. The inventors have found that the more stabilizer (sodium sulfate or sodium phosphate) is added to the reactants of suspension polymerization, the more bubbles are generated in the transparent substrate even under the same injection molding condition in which the same amount of pellets of PMMA is introduced into a hopper of the injection molding apparatus of an inline screw type, and the temperature of the heater thereof is kept constant.

The reactants during suspension polymerization of PMMA include the stabilizer such as sodium sulfate or sodium phosphate. The unused stabilizer remains in the resultant beads of polymer. It seems that optically abnormal portions such as minute bubbles are generated in a transparent substrate when the transparent substrate is produced from such beads of polymer. The inventors have discovered that the amount of stabilizer added to the reactants is related to the number of the minute bubbles generated in the transparent substrate of PMMA.

According to the subject invention, 0.15-0.25 parts by weight of the stabilizer such as sodium sulfate or sodium phosphate is first mixed with 100 parts by weight of a mixture of methyl methacrylate and either one of ethyl acrylate and methyl acrylate. Then, the resultant mixture is dipped into a suitable amount of water and the water is stirred with the dipped mixture so as to obtain a suspension system. At the same time or later on, the suspension system is heated up to a temperature above a preselected temperature at which the suspension system can initiate the suspension polymerization. Upon the lapse of a time period within which the suspension system sufficiently perform polymerization, the resultant polymer which may have the form of a slurry may be cooled down to a desired low temperature. The slurry is then mixed with an active liquid which is reactive with non-reacted substances within the slurry. The active liquid may be an inorganic acid. The resultant slurry is stirred with a suitable amount of water so as to wash the resultant slurry thereby to eliminate from the resultant slurry the compositions resulted from the reactions between the non-reacted substances and the active liquid. The washed slurry may be formed into small pieces such as pellets or beads, suitable for molding process for forming the washed slurry into a desired of an organic glass such as a substrate for an optical recording disk or an optical lens.

The washed slurry may be placed into a die without passing through the forming step so as to mold the slurry into the desired shape of the organic glass.

The washed slurry may be filtered, if preferred, before molding or pelletizing.

Various suspension polymerization were conducted by using a mixture of:
methyl methacrylate: 91 parts by weight;
ethyl acrylate: 9 parts by weight; and
sodium sulfate: 0.15 through 0.5 parts by weight.

The resultant slurry was dipped into a treating and washing vessel which carries therein a solution of sulfuric acid and stirred. The resultant slurry of polymer was processed within the dewatering machine to remove water. Thereafter the washed slurry was dried by a dryer. The resultant cake was transferred through the extruder to the pelletizer which produces pellets of PMMA.

By using such pellets of PMMA, a plurality of transparent substrates of diameter 30 cm were formed in the same injection molding condition.

The above process was repeated twice under the respective conditions in which the amounts of stabilizer are 0.5 and 0.15 parts by weight. Furthermore the above process was performed once for each of the respective conditions in which the amounts of stabilizer are 0.35 and 0.25 parts by weight.

Figure 3:
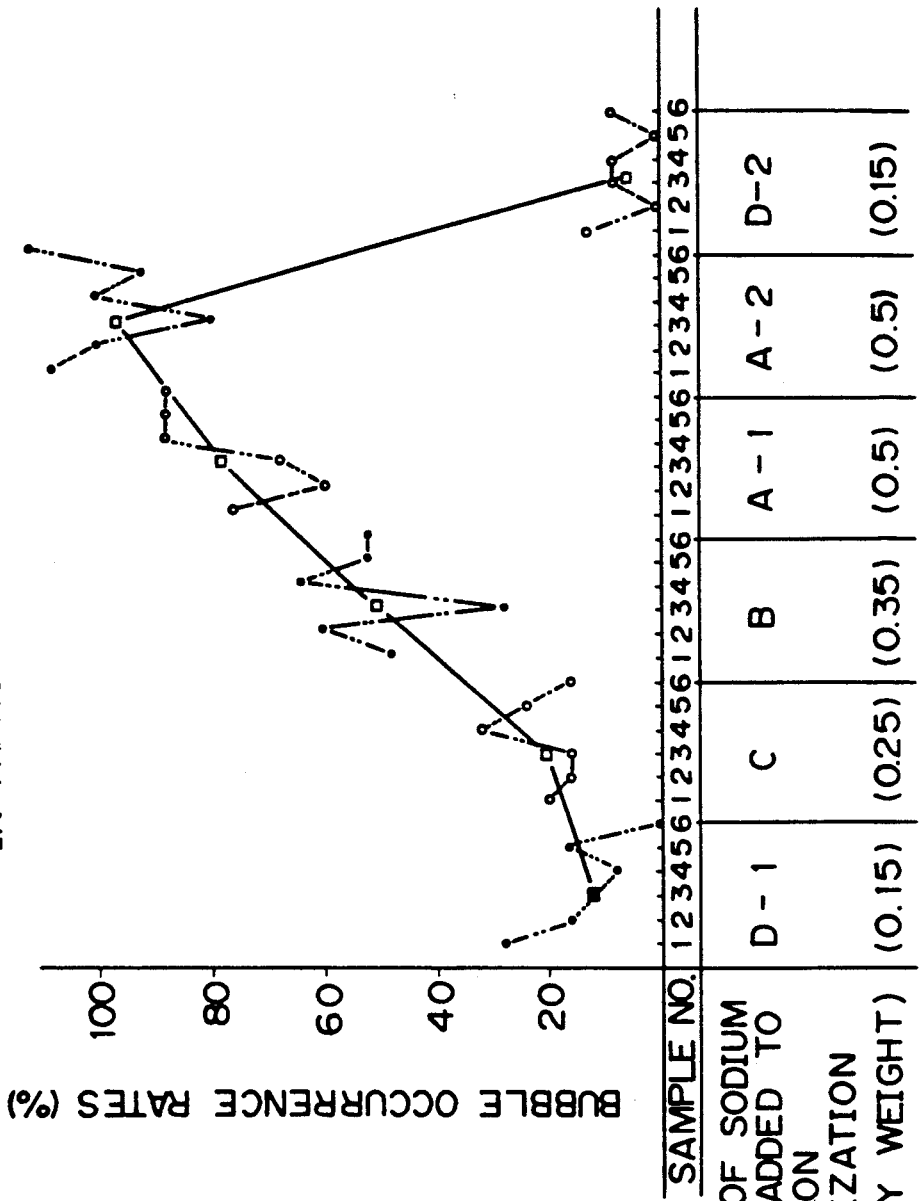
FIG. 3 is a graph showing the existence of the minute bubbles in the optical disk substrate made from pellets of PMMA in comparable examples and preferable embodiments.

The following Table and FIG. 3 show results of the experiments. On the other hand, the positive ions of 0.5–0.83 ppm remained in the resultant material.

TABLE

| Samples No. | Stabilizer of sodium sulfate (parts by weight) | Average of occurrence of bubbles in 6 substrates (%) |
| --- | --- | --- |
| A-1 | 0.5 | 100 |
| A-2 | 0.5 | 81 |
| B | 0.35 | 52 |
| C | 0.25 | 20 |
| D-1 | 0.15 | 13 |
| D-2 | 0.15 | 6 |

FIG. 3 is a graph showing the relations between the amounts of the stabilizer added to suspension polymerization and the rates of the number of bubbles generated in the transparent substrate of PMMA. The ordinate of the graph represents percentages of the number of bubbles existing within a ¼ circumference at a point of radius 13 cm from the center of the substrate, and the abscissa thereof represents sampling numbers of the transparent substrates formed in the experience. The points ○ and ● shown in the graph are respectively plotted as bubble occurrence rates of the substrates at the corresponding sampling numbers, and each of the squares □ is plotted as an average bubble occurrence rate of every 6 substrates obtained from the same batch of suspension polymerization.

As seen from the table and FIG. 3, it is apparent that minute bubbles are remarkably reduced in a range less than 0.25 part by weight of the stabilizer. However, it is required that the stabilizer is added to the reactants at a rate within a range more than 0.15 part by weight with respect to resin 100 part by weight, because the polymerization is not smoothly conducted under the condition of the stabilizer less than 0.15 part by weight.

In addition, sodium phosphate may be used as the stabilizer in suspension polymerization besides sodium sulfate. In suspension polymerization, methyl methacrylate may be varied within 90 through 92 parts by weight, and ethyl acrylate or methyl acrylate may be varied within 7 through 9 parts by weight so that resin monomers become 100 parts by weight as a total. In this case, the same advantageous effect is obtained as the above mentioned embodiments.

As mentioned above, the acrylic resin for the optical video disk substrate according to the present invention is prepared through suspension polymerization in which reactants include 100 parts by weight of a mixture of methyl methacrylate and either one of ethyl acrylate and methyl acrylate, and sodium sulfate or sodium phosphate 0.15 through 0.25 parts by weight. By using such an acrylic resin, there is obtained such an optical video disk that the deterioration of the "color flash" is remarkably reduced in the reproduced image therefrom because of reduction of bubbles therein.

What is claimed is:

1. A method for producing an acrylic resin suitable for use in producing a substrate of an optical recording disk, comprising the steps of:
   (1) producing an acrylic resin through suspension polymerization of a reaction mixture in an aqueous polymerization medium by
      (a) mixing 0.15-0.25 parts by weight of sodium sulfate or sodium phosphate with 100 parts by weight of a mixture of methyl methacrylate and either one of ethyl acrylate and methyl acrylate;
      (b) stirring the resultant mixture with water so as to prepare a suspension system while heating above a preselected temperature; and
      (c) mixing the resultant mixture with an active liquid which is reactive with non-reacted substances within the resultant, and
   (2) washing the resin, whereby the average bubble occurrence rate is less than about 20%, in comparison to the bubble occurrence rate obtained using 0.5 parts by weight of sodium sulfate stabilizer, when forming the washed resin into at least one substrate of an optical recording disk.

2. A method as claimed in claim 1, wherein said mixture comprises about 90 to 92 parts by weight of methyl methacrylate and about 7 to 9 parts by weight of methyl acrylate or ethyl acrylate.

3. A method as claimed in claim 1, wherein the concentration of residual sodium positive ions in said acrylic resin is 0.5-0.83 ppm.

* * * * *